United States Patent
Rebiere

(10) Patent No.: US 7,556,557 B2
(45) Date of Patent: Jul. 7, 2009

(54) WELDING ROBOT COMPRISING AN ELECTRODE GRINDER SECURED ON A MOVING ASSEMBLY OF SAID WELDING ROBOT

(75) Inventor: Hervé Rebiere, Viarmes (FR)

(73) Assignee: ABB MC, Saint-Ouen-l'Aumone (FR)

( * ) Notice: Subject to any disclaimer, the term of this patent is extended or adjusted under 35 U.S.C. 154(b) by 0 days.

(21) Appl. No.: 10/576,124

(22) PCT Filed: Oct. 11, 2004

(86) PCT No.: PCT/FR2004/002569

§ 371 (c)(1),
(2), (4) Date: Apr. 14, 2006

(87) PCT Pub. No.: WO2005/037481

PCT Pub. Date: Apr. 28, 2005

(65) Prior Publication Data

US 2007/0149095 A1      Jun. 28, 2007

(30) Foreign Application Priority Data

Oct. 14, 2003   (FR)   .................................. 03 11974

(51) Int. Cl.
*B24B 7/00* (2006.01)
(52) U.S. Cl. ...................... 451/67; 219/86.33; 451/439; 901/42
(58) Field of Classification Search .............. 219/86.25, 219/86.33, 86.7, 119; 409/140, 180, 181; 451/5, 65, 67, 331; 901/41, 42
See application file for complete search history.

(56) References Cited

U.S. PATENT DOCUMENTS

| 4,966,504 A | * | 10/1990 | Seme et al. ................ 409/140 |
| 5,197,228 A | * | 3/1993 | Sharkey et al. ................ 451/5 |
| 5,445,481 A | * | 8/1995 | Nakajima et al. ........... 409/140 |
| 5,449,878 A | | 9/1995 | Beneteau et al. |
| 6,339,204 B1 | * | 1/2002 | Kato et al. ................ 219/86.7 |
| 2002/0087233 A1 | | 7/2002 | Raab |

FOREIGN PATENT DOCUMENTS

FR    2 750 631         1/1998
JP    04367379 A   *   12/1992

OTHER PUBLICATIONS

Patent Abstracts of Japan, vol. 018, No. 435 (M-1655), Aug. 15, 1994 & JP 06 134683 A (FANUC Ltd), May 17, 1994 abstract.
Patent Abstracts of Japan, vol. 013, No. 376 (M-862), Aug. 21, 1989 & JP 01 130886 A (Mitsubishi Electric Corp), May 23, 1989 abstract.
Patent Abstracts of Japan, vol. 017, No. 244 (M-1410), May 17, 1993 & JP 04 367379 A (Mitsubishi Electric Corp), Dec. 18, 1992 abstract.

* cited by examiner

*Primary Examiner*—Timothy V Eley
(74) *Attorney, Agent, or Firm*—Young & Thompson

(57) ABSTRACT

A welding robot (1) comprising a stand (2) pivotally receiving a trunk-forming portion (3) having one end (5) of an articulated arm (6) pivotally mounted thereon, the arm having an opposite end (7) provided with a clamp (8) fitted with welding electrodes, the robot including an electrode grinder (9) mounted on a portion (3) of the robot that is situated in a zone that is accessible to the clamp.

2 Claims, 2 Drawing Sheets

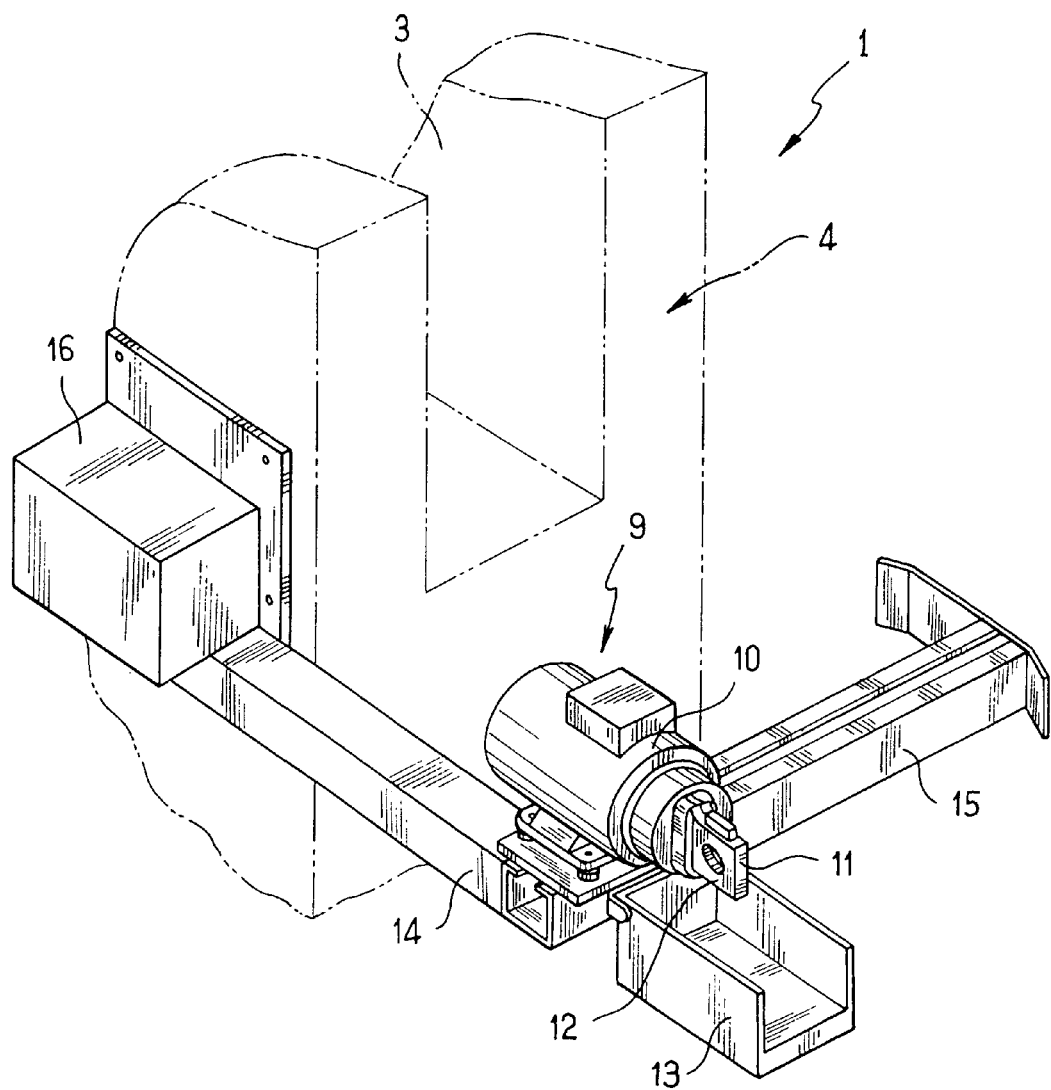
FIG_2

WELDING ROBOT COMPRISING AN ELECTRODE GRINDER SECURED ON A MOVING ASSEMBLY OF SAID WELDING ROBOT

The present invention relates to a welding robot suitable for use in particular for assembling sheet metal motor vehicle bodywork parts.

BACKGROUND OF THE INVENTION

A welding robot generally comprises a stand pivotally receiving a trunk-forming portion having connected thereto via a hinge known as a "shoulder" an articulated arm having a free end that is provided with a clamp fitted with welding electrodes.

The pressure exerted on the metal sheets by the welding electrodes, and the heat generated by electrical currents passing through the electrodes leads to the electrodes becoming deformed, tending to increase the contact area between the electrodes and the metal sheets. This reduces the density of the current flowing through the electrodes, so it is necessary periodically to increase the current level, and then once the deformation becomes too great, it is necessary to grind the electrodes in order to return them to their initial shape.

Such grinding is performed using a grinder secured to the ground or to the platform supporting the robot, and in the vicinity of the robot.

The positioning of the grinder must be taken into account when programming the movements of the robot, firstly in order to bring the clamp into the grinder, and secondly in order to ensure that the movements of the robot do not interfere with the grinder during welding operations.

The positioning of the grinder is also taken into account while programming adjacent robots so that their movements do not lead to them bumping into the grinder.

The paths followed by cableways receiving cables for powering robots and grinders also depend on the positioning of the grinder.

Unfortunately, once a robot has been installed in the line in which it is to work, it can happen that the grinder cannot be positioned in the initially intended position. For example, this can be the result of a manhole cover or an expansion joint preventing the grinder being secured to the ground.

It is then necessary to reposition the grinder and thus to correct the programming of the robot, and possibly also of adjacent robots, and to reorganize the paths of the cableways.

The same applies when the robot and the grinder are mounted on a platform: the presence of beams, cables, or openings can interfere with installing the grinder.

A robot is described, in particular in U.S. Pat. No. 6,339,204, that has a grinder secured to the stand of the robot. With the grinder mounted on the robot, the power supply cabling to the grinder can be combined with the power supply cabling to the robot. In addition, the grinder is secured to the ground as a result of the robot being secured to the ground, so no additional operations are required. Nevertheless, the grinder can still interfere with the movements of the robot or with the movements of its neighbors, and its position needs to be taken into account when programming the robot.

OBJECT OF THE INVENTION

An object of the invention is to provide means enabling the electrodes of a welding robot to be ground, which means are simple to install and give rise to limited interference with respect to the welding robot or to nearby robots.

BRIEF SUMMARY OF THE INVENTION

To this end, the invention provides a welding robot comprising a stand pivotally receiving a moving assembly comprising a trunk-forming portion having one end of an articulated arm pivotally mounted thereon, an opposite end of the arm being provided with a clamp fitted with welding electrodes, and an electrode grinder being mounted on the moving assembly in a zone that is accessible to the clamp.

Thus, the grinder moves together with the moving assembly. Grinding can then be performed while the robot is moving, for example while the robot is backing off after performing a welding operation. In addition, it is possible to cause the grinder to back off in order to avoid interfering with the movements of a neighboring robot by pivoting the moving assembly on which the grinder is mounted.

The grinder is preferably mounted on the trunk-forming portion.

Placing the grinder on the trunk-forming portion is advantageous since that is a zone that is easily accessible for the clamp and it possesses a large amount of room for securing the grinder. It is also easy to back off the grinder merely by pivoting the trunk-forming portion, the grinder remaining relatively far away from the working zone of the welding clamp and not interfering with the movements of the arm.

Advantageously, the grinder is located in the vicinity of a front face of the trunk-forming portion.

When the welding robot is in a standby position, the clamp is generally in the vicinity of the front face of the trunk-forming portion. Simply turning the clamp around, or at least moving the arm through a movement of small amplitude, then suffices to bring the clamp into the grinding position.

Also advantageously, the grinder is mounted on a horizontal slideway secured to the trunk-forming portion so as to extend in front of the front face thereof.

The position of the grinder can thus be modified as a function of the type and the dimensions of the clamp fitted to the robot arm.

Other characteristics and advantages of the invention appear on reading the following description of a particular and non-limiting embodiment of the invention.

BRIEF DESCRIPTION OF THE DRAWINGS

Reference is made to the accompanying drawings, in which:

FIG. 2 is a diagrammatic perspective view of the grinder fitted to the robot.

DETAILED DESCRIPTION OF THE INVENTION

Figure 1:
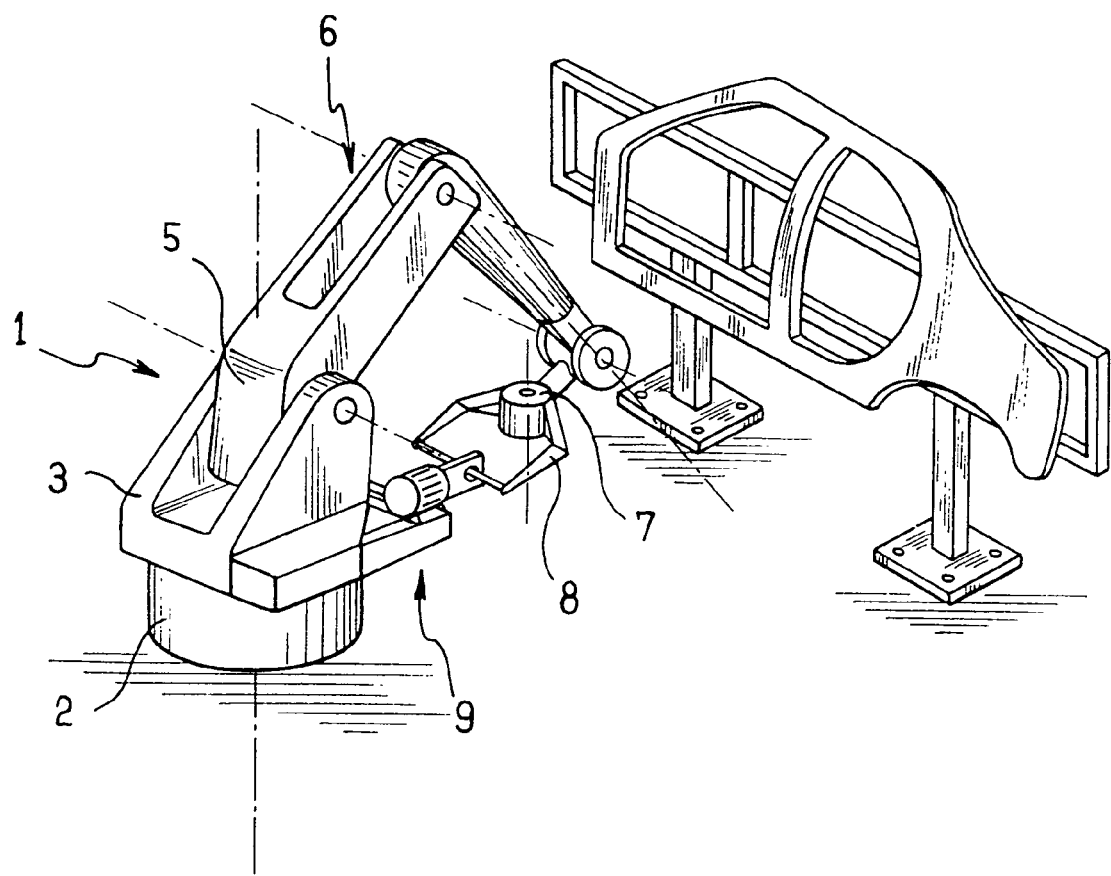
FIG. 1 is a diagrammatic perspective view of a robot in accordance with the invention.

The robot in accordance with the invention given overall reference 1 is a six-axis robot comprising in conventional manner: a stand 2 receiving a trunk-forming portion 3 to pivot about a vertical axis, the trunk-forming portion 3 having a front face 4.

One end 5 of an articulated arm is mounted on the trunk-forming portion 3, the arm being given overall reference 6 and being capable of pivoting about a horizontal axis parallel to the front face 4. The connection between the trunk-forming portion 3 and the articulated arm 6 is referred to as the "shoulder" of the robot.

At its end 7 opposite from the end 5, the articulated arm 6 possesses a clamp 8 having two jaws with free ends that are equipped with respective welding electrodes.

The trunk-forming portion 3 and the articulated arm 6 together form the moving assembly of the robot.

The robot 1 includes a grinder, given overall reference 9, which in conventional manner comprises a motor 10 for driving two cutters rotatably mounted in a support 11 that is open via two opposite faces 12 so as to allow the electrodes to be put in contact with the cutting edges of the cutters. The faces 12 are shown as being vertical, with the cutters rotating about horizontal axes perpendicular to said faces so that the swarf is evacuated under gravity into a recovery bin 13 located beneath the support 11.

The motor 10 of the grinder 9 is shown bolted to an L-shaped bracket comprising a portion for fastening to the trunk-forming portion 3 and a terminal portion in the form of a slideway 15 along which the position of the grinder 9 can be adjusted. The bracket 14 is shown as extending in a horizontal plane, with the fastening portion being mounted on one side of the trunk-forming portion 3 so that the slideway 15 extends in front of its front face 4.

Thus, when the robot is in a standby position, the clamp 8 then being near the front face 4, the clamp can be turned around so as to bring it into the grinder 9 (see FIG. 1). By adjusting the position of the grinder 9 along the slideway 15, it is possible to position the grinder as a function of the width of the clamp 8 (the other dimensions of the clamp 8 being taken into account when programming the movements of the robot in order to bring the clamp 8 into the grinder 9).

It should be observed that with the grinder 9 being positioned once and for all on the robot 1, programming the robot is simplified. There is no need to provide for the grinder to be secured to the ground nor is there any need to provide cable ways for the power supply cables of the grinder, since these cables are included in the cable bundle powering the robot 1 prior to being connected to the power supply unit 16 of the grinder 9.

It should also be observed that since the grinder 9 is secured to a moving portion of the robot 1, grinding can take place while the robot 1 is itself backing off after it has performed a welding operation.

Naturally, the invention is not restricted to the embodiment described above and variant embodiments can be provided without thereby going beyond the ambit of the invention as defined by the claims.

In particular, the grinder can be secured to a portion of the robot 1 other than its trunk-forming portion, for example to the arm 6 in the vicinity of the shoulder of the robot.

Under all circumstances it is appropriate to ensure that the grinder does not interfere with the movements of the robot 1 and is located in a zone that is accessible for the clamp 8.

The grinder support bracket may be of a shape other than that described, for example it may comprise a leg extending from a bottom portion of the robot such as the stand. The grinder may be secured to the free end of the leg. The grinder may optionally be adjustable in position in a direction that is parallel to the hinge axis of the robot's shoulder.

The structure of the robot may be different from that described, and for example it need not have as many as six axes.

What is claimed is:

1. A welding robot (1) comprising a stand (2) pivotally receiving a moving assembly comprising a trunk-forming portion (3) having one end (5) of an articulated arm (6) pivotally mounted thereon, an opposite end (7) of the arm being provided with a clamp (8) fitted with welding electrodes, the robot including an electrode grinder (9) mounted on its moving assembly in a zone that is accessible to the clamp, the grinder (9) being mounted on a horizontal slideway (15) secured to the trunk-forming portion (3) to extend in front of a front face of the trunk-forming portion and to pivot together with the trunk forming portion.

2. A welding robot comprising:
   a stand;
   a moving assembly pivotably mounted on said stand and including a trunk-forming portion; and
   an articulated arm having a first end pivotably connected to said trunk-forming portion and an opposite second end having a clamp fitted with welding electrodes;
   an L-shaped bracket having a first portion extending from a side of said trunk-forming portion and substantially perpendicular to a front face of said trunk-forming portion and a second portion extending substantially parallel to said front face, said second portion forming a slideway; and
   an electrode grinder slidably adjustable in said slideway.

* * * * *